United States Patent [19]

Barta

[11] Patent Number: 5,083,999

[45] Date of Patent: Jan. 28, 1992

[54] ELECTROSTATIC PINNING IN A PROCESS FOR GUSSETING FILM WEB

[76] Inventor: Raymond D. Barta, 505 Heathermoor, Midland, Mich. 48640

[21] Appl. No.: 547,416

[22] Filed: Jul. 3, 1990

Related U.S. Application Data

[63] Continuation of Ser. No. 414,843, Apr. 29, 1989, abandoned, which is a continuation-in-part of Ser. No. 272,855, Nov. 18, 1988, abandoned.

[51] Int. Cl.$^5$ .............................................. B65H 45/16
[52] U.S. Cl. ................................... 493/439; 493/440; 493/405; 493/467
[58] Field of Search ............... 493/439, 467, 443, 248, 493/267, 394, 405, 416, 436, 440, 467

[56] References Cited

U.S. PATENT DOCUMENTS

| 3,678,813 | 7/1972 | Wech | 93/20 |
| 4,433,527 | 2/1984 | Ramsey et al. | 53/548 |

*Primary Examiner*—Frederick R. Schmidt
*Assistant Examiner*—Jack Lavinder

[57] ABSTRACT

Disclosed is an apparatus and process for gusseting plastic film web having a means for applying an electrostatic charge of negative or positive polarity to the gusset to maintain stable gusset folds prior to storing or processing the gusseted web into a multiplicity of gusseted bags.

8 Claims, 2 Drawing Sheets

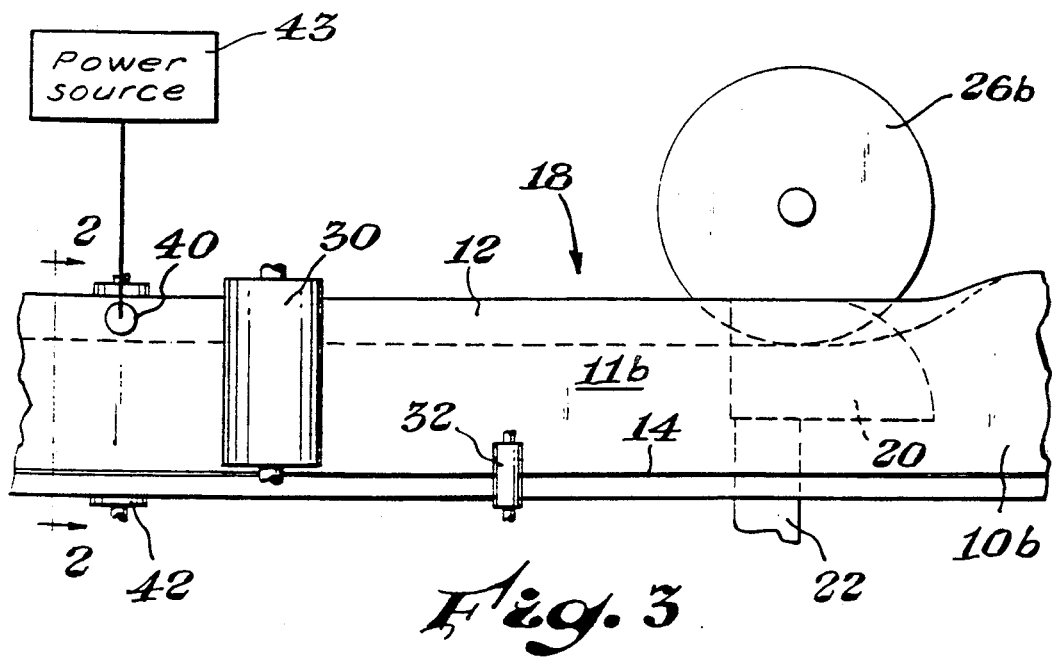
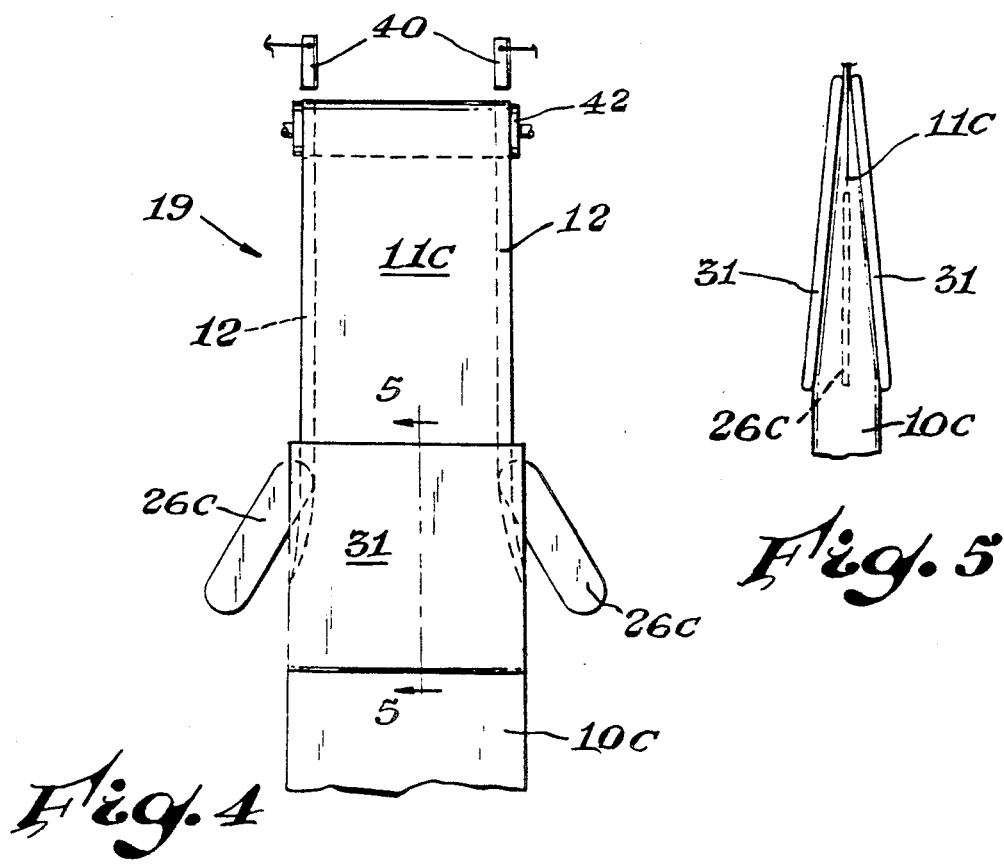

ELECTROSTATIC PINNING IN A PROCESS FOR GUSSETING FILM WEB

CROSS-REFERENCE TO A RELATED APPLICATIONS

This is a continuation of application Ser. No. 414,843 filed Sept. 29, 1989 now abandoned which is a continuation-in-part application of U.S. Ser. No. 272,855 filed Nov. 18, 1988 now abandoned. U.S. Ser. No. 272,855 is incorporated herein by reference.

BACKGROUND OF THE INVENTION

The present invention involves the maintenance of stability of gussets in thermoplastic bags following the formation of such gussets during manufacture of the bag. Gusseted plastic bags are typically manufactured from a substantially continuous sheet of dual-walled plastic film integrally connected along at least one continuous edge. The edge of the film web opposite the integrally connected edge may be open-sided or openable along fastening means such as a zipper. Further, the film web may be tubular in form.

A gusset is formed when an integrally connected film web edge is folded inward to form folds along that edge as illustrated in Wamsley, U.S. Pat. No. 2,961,930. The film web may then be severed and sealed to form individual gusseted bags. Upon filling of the gusseted bag, the gusset folds expand to reveal side or bottom walls of dimension commensurate with the width of the folds. Gusseted plastic bags have advantages over ungusseted plastic bags in that they may be stood upright upon filling or have rectangular sides.

Numerous apparatus which form gussets in plastic film web are known in the prior art. Wech, U.S. Pat. No. 3,678,813 and Knuetter, U.S. Pat. No. 2,283,069 relate apparatus for gusseting an open-sided film web. Hummel et al., U.S. Pat. No. 4,526,565 and Rochla, U.S. Pat. No. 3,587,907 relate an apparatus for gusseting a tubular film web.

A common processing problem encountered is maintainance of stability of the gusset after formation thereof. The term stability refers to the extent to which the gusset fold configuration is maintained after the gusset is introduced into the film web. The depth and alignment of the gusset folds with respect to each other and the entire web must be substantially maintained until the severing and sealing of the film web into individual bags. Gusset stability after severing and sealing is not a problem since the gusset structure is permanently sealed into the resulting bag.

A common method of enhancing gusset stability is passing the film web through mechanical means to press the gusset folds into the film web and maintain the resulting creases thereafter by providing an adequate level of process film web tension in the machine direction. These measures may be inadequate since many types and thicknesses of plastic film web, particularly polyethylene films less than two-thousandths of an inch in thickness, have negligible creasibility.

Another common processing problem encountered with gusseted bags is the formation of leakage points along the side welds of individual bags after severing and sealing of the bag film web. The formation of leakage points is due to incomplete heat sealing of the edges of the walls of the bag including those of the gusset. Air or liquid may leak out of the bag leakage points if the bag is filled with either or both. A particular problem leakage area along the side weld is at the top or the innermost point of the inward fold of the gusset.

Accordingly, there exists a need for a process for gusseting a continuous, dual-walled thermoplastic film web wherein the stability of the gusset is maintained and the incidence of leakage points along the side welds of individual bags formed from the gusseted film web is minimized.

SUMMARY OF THE INVENTION

The invention described herein discloses means for maintaining the stability of gussets in plastic film web after formation thereof in a gusseting apparatus and reducing the incidence of leakage points along the side welds of individual bags formed from the gusseted film web. Means for maintaining gusset stability and reducing the incidence of leakage points include applying an electrostatic charge of negative or positive polarity to the gusset after formation thereof and prior to disposition of the gusseted film web.

The means for applying an electrostatic charge to the gusset comprise an electrostatic charging source and an electrically conductive grounded surface positioned about the gusset of the film web. The electrostatic charge imparted to the gusset causes the gusset folds or the respective walls of each fold to cling to each other at least until the time of disposition of the film web.

BRIEF DESCRIPTION OF THE DRAWINGS

The novel features of the present invention and the context within which they are set will be better understood upon reviewing the following specification together with the several drawings in which the same reference numbers are employed for the same parts in the various views and wherein:

FIG. 3 is a plan view of another embodiment of an apparatus made in accordance with the present invention for use with a film web having a zippered edge;

FIG. 4 is a plan view of another embodiment of an apparatus made in accordance with the present invention for use with a film web having tubular form; and FIG. 5 is a cross-sectional view of the apparatus of FIG. 4 taken along line 5—5.

DETAILED DESCRIPTION OF THE INVENTION

Figure 1:
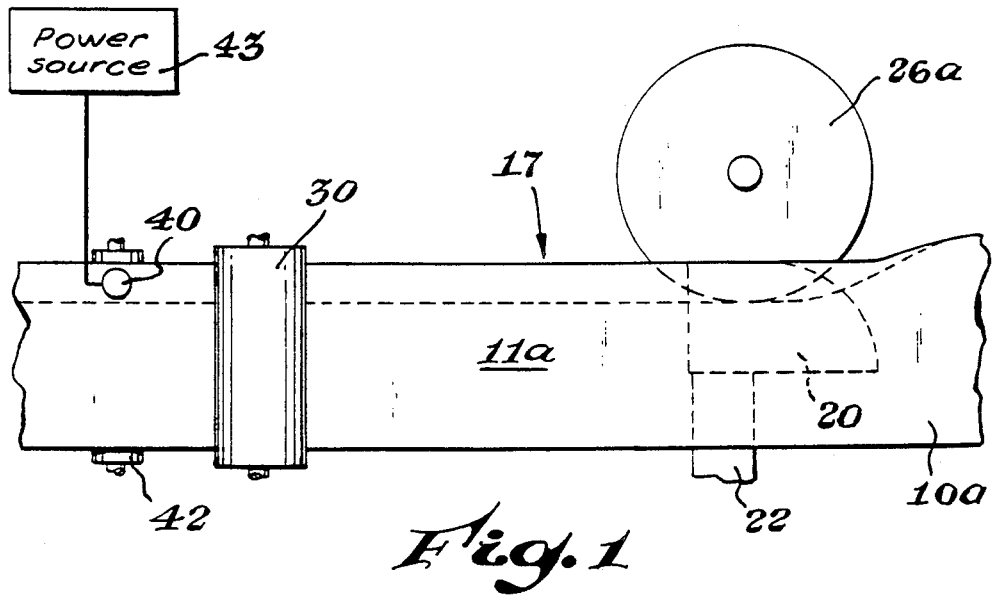
FIG. 1 is a plan view of an embodiment of an apparatus made in accordance with the present invention for use with a film web having an open side.
Figure 2:
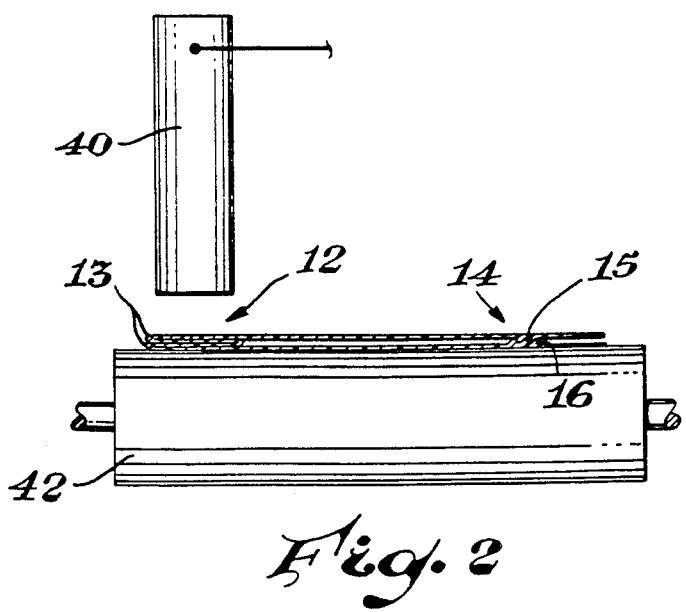
FIG. 2 is a fragmentary cross-sectional view taken along line 2—2 of the apparatus of FIG. 3.

Improved gusseting apparatus of the present invention for open-sided and zippered dual-walled webs of plastic film having walls integrally connected along at least one continuous edge are referenced generally by the numerals 17 and 18, respectively, and are illustrated in FIGS. 1 and 3, respectively. An improved gusseting apparatus of the present invention for tubular, continuous webs of plastic film is referenced generally by the numeral 19, and is illustrated in FIG. 4. The three embodiments described herein are disclosed for purposes of illustration, and are not to be construed as limiting.

The ungusseted film web is referenced generally by the numeral 10, and is so denoted in the specification when referring to ungusseted film without regard to form of web 10, and is readable on reference numerals 10a, 10b, and 10c found on the drawings. A web 10 open-sided along the edge opposite the edge of integral connection is specifically referenced by the numeral 10a. The corresponding numerals for web 10 having zippered or tubular stock are 10b or 10c, respectively. After a gusset or gussets 12 have been introduced therein, film web 10 is generally refered to as gusseted film web 11, and is readable in reference numerals 11a, 11b, and 11c found on the drawings. The corresponding specific reference numerals of web 11 for open-sided, zippered, and tubular stock are 11a, 11b, and 11c, respectively.

Gusseting apparatus described herein comprise a means of providing a plastic film web 10, a means for formation of a gusset 12, means for expelling entrapped air from gusseted film web 11, and means for applying an electrostatic charge to gusset 12 sufficient to cause gusset folds 13 of gusset 12 to cling together, means for disposing of gusseted film web 11, and means for sequentially advancing film web 10 from the means for providing film web 10 to means for disposing of gusseted film web 11.

References to the means, process, or apparatus for forming or formation of gusset 12 differ from references to the process or apparatus for gusseting or references to a gusseting process or apparatus for purposes of the present invention. Apparatus or process for gusseting or gusseting process or apparatus refer to the entire process of gusseting from the means of providing film web 10 to the means for disposing of gusseted film web 11. Means, process, or apparatus for forming or formation of gusset 12 refer only to the physical formation of gusset 12 itself.

The means of providing plastic film web 10 for the process of the present invention may be fresh-extruded web 10, prior-extruded web 10 from a feed roll or other storage receptacle, or extruded web 10 from another process stage situated prior to the gusseting apparatus.

The means for formation of gusset 12 in plastic film webs 10a or 10b comprise two or more thin, closely-spaced, generally parallel and aligned receiving plates 20 and one or more thin protruding plates 26a or 26b protruding between and generally equidistant from and generally parallel to receiving plates 20. Receiving plates 20 are positioned inside webs 10a and 10b of each respective embodiment contiguous to the integrally connected edge of webs 10a and 10b to be gusseted. Protruding plates 26a and 26b are positioned outside webs 10a and 10b contiguous to the integrally connected edges of webs 10a and 10b to be gusseted. The extent of protrusion by protruding plates 26 between receiving plates 20 is determinative of the depth or width of gusset 12.

The means for formation of gusset 12 film web 10c of tubular dimension comprises protruding plate 26c situated outside web 10c contiguous to the integrally connected edges of web 10c and protruding therein. A preferred means is illustrated in FIG. 4 and comprises a pair of generally oppositely situated and generally horizontally aligned protruding plates 26c which form two gussets 12 of preferably equal depth on opposite sides of web 10c. Plates 26c intercept the planes tangential to the integrally connected edges of web 10c. There is enough air pressure within web 10c at the juncture of web 10c and plates 26c to allow overlap of the integrally connected edge of web 10c over and under plates 26c or portions of plates 26c thereof. It is foreseeable that plate 26c could be used to form gusset 12 in non-tubular webs such as zippered web 10b if sufficient air pressure is present within.

The preferred material of construction of receiving plates 20 and protruding plates 26a, 26b, and 26c is metal, though any rigid material such as a rigid plastic or a finished, polished wood may be utilized.

The preferred shape of protruding plate 26 is thin and circular, though any shape such as an ellipse or a rectangle capable of forming gusset 12 without damaging the physical integrity of film web 10 may be utilized. Thin and circular protruding plates 26a and 26b are seen in FIGS. 1 and 3, and a generally rectangular protruding plate 26c is seen in FIG. 4. The preferred shape of receiving plates 20 is wing-like as in FIGS. 1 and 3, though any shape such as a rectangle or a square which is capable of forming gusset 12 without damaging the physical integrity of film web 10 may be utilized. Any corners or edges of the protruding plates 26a, 26b, and 26c or receiving plates 20 that come into contact with web 10 are preferably rounded or smoothed off.

Means for expelling entrapped air from the film web comprise means for substantially preventing the passing of entrapped air in gusseted film web 11 and means for venting accumulated air. Means for substantially preventing the passing of entrapped air in web 11 can comprise a pair of juxtapositioned intersecting plates 31 or, preferably, a pair of juxtapositioned nip rollers 30 between which web 11 is passed. Intersecting plates 31 are seen in FIGS. 4 and 5 and nip rollers 30a in FIGS. 1 and 3. Nip rollers 30 and intersecting plates 31, being closely adjacent, press together the walls of web 11, and do not allow the passing therethrough of a substantial proportion of air entrapped in web 11. For film web 11c, intersecting plates 31 provide the additional function of flattening the tubular form to provide more defined integrally connected edges suitable for formation of gusset 12 therein than do nip rollers 30. It is seen that other equivalent means for pressing together the walls of web 11, such as a pair of juxtapositioned flat plates, may be utilized. Accumulated entrapped air trapped behind nip rollers 30 or intersecting plates 31 must be vented to prevent the entrapped air from blowing out gusset 12 after it is formed, as it is formed, or from preventing its formation altogether.

Means for venting accumulated air vary with the configuration of webs 10 and 11. For webs 10a and 11a, the open side serves to vent accumulated air. For webs 10b and 11b, means for venting accumulated air will preferably comprise bar 22 and closure rollers 32, which are located downstream from bar 22. Bar 22 separates rib and groove profiles 15 and 16 of zipper 14 as web 10b passes around it. Closure rollers 32 comprise a pair of juxtapositioned rollers which reinterlock rib and groove profiles 15 and 16 as zipper 14 passes therethrough. The open side of web 11b along zipper 14 serve to vent accumulated air. For all webs 10 and 11 but particularly webs 10c and 11c, alternate means of venting accumulated air such as an orifice or bleeder valve (not shown) upstream in the extrusion die may be utilized.

Situated after the means for preventing the passing of entrapped air in gusseted film web 11 is the means for applying an electrostatic charge to gusset 12 sufficient to cause gusset folds 13 to cling to each other. The means preferably comprise an electrostatic charging source situated about and most preferably above the upper surface of gusset 12 of web 11 and an electrically-conductive, grounded surface situated about and most preferably below the bottom surface of gusset 12 of web 11 in general opposite alignment with the charging source. The arrangement of the electrostatic charging source and the electrically conductive grounded surface with respect to web 11 could, however, be reversed. The grounded surface is adjacent to film web 11 and, most preferably, contiguous thereto.

A preferred grounded surface comprises an electrically-conductive, grounded roller 42, which substantially traverses the transverse width of web 11 passing thereover.

A preferred electrostatic charging source comprises an electrostatic charging head 40 and a power source 43 in electrical connection therewith. The preferred positional arrangement for charging head 40 and grounded roller 42 with respect to each of gusseting apparatus 17, 18, and 19 and film web 10 is illustrated in FIGS. 1, 2, 3, and 4.

Charging head 40 is preferably provided with and is capable of applying about 5 to about 30 kilovolts in charge magnitude by power source 43 seen in FIGS. 1 and 3, and is situated about ¼ to about 3 inches above the upper surface of the gusset 12. The height and required charge of charging head 40 are a direct function of each other. The greater the height of charging head 40, the greater the required voltage necessary to stabilize gusset 12. More preferably, charging head 40 is provided with and is capable of applying about 10 to about 25 kilovolts in charge magnitude by power source 43, and is situated about ⅜ to about 1 inch above the upper surface of gusset 12. Most preferably, charging head 40 is provided with and is capable of applying about 15 kilovolts in charge magnitude by power source 43, and is situated about 1 inch above the upper surface of gusset 12. Power source 43 is capable of providing and charging head 40 is capable of applying electrostatic charge of either positive or negative polarity. Whether positive or negative polarity is desirable depends upon the polarity characteristics and composition of film web 10. The preferred polarity for use with a primarily polyethylene-based film is negative.

A representative suitable power source 43 is the Simco N27C Negative Polarity Static Charging Unit by Simco Co., Inc., and a representative suitable charging head 40 is the Multipoint Spot Charger 40016 obtainable from the same supplier.

The phenomenon by which the electrostatic charge stabilizes gusset 12, i.e. causes gusset folds 13 to cling together or be mutually attracted to one another, is not completely understood, but is believed to result from electron imbalances in gusset folds 13. A negative charging field created by charging head 40, which is situated above the upper surface of gusset 12, is believed to repulse electrons away from that surface creating alternating polarities between adjacent contacting surfaces of the walls of gusset folds 13. The opposite polarities between contacting surfaces causes the walls of folds 13 and folds 13 themselves to cling together. Likewise, a positively charged charging head 40 may create alternating polarities reverse that of a negatively charged charging head 40.

The means for applying an electrostatic charge of sufficient magnitude to the gusset to cause the gusset folds to cling to each other also includes those devices which utilize two electrostatic charging sources (not shown) of opposite polarity situated oppositely about the gusset. Further, the means includes those devices which utilize direct current, alternating current, or a combination of both as seen in Levy, 3,892,614, the teachings of which are herein incorporated by reference.

The mutual attraction or cling of gusset folds 13 from the application of an electrostatic charge thereto has been observed to last as long as a week. Such attraction may be necessary for only a few minutes if gusseted film web 11 is being severed and sealed into individual bags soon after application of the charge. This sustained attraction can be useful, however, in that it allows bifurcation of the steps of forming gusset 12 in film web 10 and severing and sealing of web 11 into bags. Web 11 can be wound on rolls or other storage receptacles and severed and sealed later until substantial charge dissipation has taken place. This residual charge imbalance is believed to be due to the semi-conductive nature of many types of film compositions for plastic bags. The films are generally conducive to static charging from a strong external source, but exhibit only gradual dissipation of acquired charge.

Situated after the means for applying an electrostatic charge to gusset 12 is the means for disposing of gusseted film web 11. The means for disposing of web 11 will usually comprise either means for severing and sealing of web 11 into individual bags (not shown) or means for winding up of web 11 on a takeup roll or other storage receptacle (not shown) for subsequent storage, transportation, processing, and eventual severing and sealing into individual bags. Representative means for severing and sealing of web 11 into individual bags are seen in the sealing apparatuses of Tumminia, U.S. Pat. No. 4,396,449 and Carland, U.S. Pat. No. 2,711,779 both of which are incorporated herein by reference.

The application of an electrostatic charge to gusseted film web 11 results in an additional advantage in a lower incidence of formation of leakage points along the side welds of individual bags formed from the severing and sealing of film web 11. Though not wishing to be bound by any particular theory, the lower incidence of leakage points is believed to be due to a higher degree of cling and a tighter and closer positioning of the walls of gusseted film web 11 including gusset 12 itself due to induced static charges. The closer positioning of the walls of gusseted film web 11 result in side welds with a lower incidence of leakage points after severing and sealing by a heated wire such as seen in U.S. Pat. No. 4,396,449 and U.S. Pat. No. 2,711,779.

Means for advancing web 10 from means for providing web 10 to means for disposing of web 11, or, in other words, from start to finish, refers to any mechanical or electromechanical process or urging mechanism for accomplishing the same. Examples of such means include mechanically or electrically driven takeup mandrels or a coordinated drive roller system. Webs 10 and 11 may be either sequentially or continuously advanced.

While the preferred embodiments of the invention have been shown with regard to specific details in gusseting processes, it will be appreciated that depending upon the gusseting process and the manufacturer's desires, the invention may be modified by various changes while still being fairly within the scope of the general teachings and principles hereof.

What is claimed is:

1. A process for gusseting a continuous, dual-walled plastic film web having walls integrally connected along at least one continuous edge, comprising providing a film web, forming a gusset having gusset folds continuously along the integrally connected edge of the film web, passing the gusset in proximity to an electrostatic charging source providing an electrostatic charge of sufficient magnitude to the gusset to cause the gusset folds to cling to each other, and disposing of the film web.

2. The process as recited in claim 1, wherein forming the gusset comprises passing the dual walls of the integrally connected edge over and past two or more closely-spaced receiving plates and around one or more protruding plates, the receiving plates being generally parallel and aligned, and the protruding plates protruding between and being generally equidistant from and generally parallel to the receiving plates.

3. The process as recited in claim 1, wherein forming the gusset in the film web comprises passing the integrally connected edge along and past a protruding plate to form a gusset along the integrally connected edge.

4. The process according to claim 1, wherein passing the gusset comprises passing the gusset between the electrostatic charging source and an electrically-conductive, grounded surface, the charging source and the grounded surface being generally oppositely situated about the plane in which the gusset is drawn, and the grounded surface being adjacent to the plane in which the gusset is drawn.

5. The process according to claim 4, wherein the charging source comprises an electrostatic charging head and an electrostatic power source, the charging head being in electrical connection with the electrostatic power source, the charging head being situated about ¼ to 3 inches from the plane along which the gusset will be drawn, and the power source being capable of providing and the charging head being capable of applying about 5 to 30 kilovolts of charge.

6. The process according to claim 5, wherein the charging head is situated about ½ to 1 and ½ inches from the plane along which the gusset will be drawn, and the power source being capable of providing and the charging head being capable of applying about 10 to 25 kilovolts of charge.

7. The process according to claim 6, wherein the charging head is situated about 1 inch from the plane along which the gusset will be drawn, and the power source being capable of providing and the charging head being capable of applying about 15 kilovolts of charge.

8. The process according to claim 5, wherein the electrically conductive, grounded surface comprises an electrically conductive, grounded roller.

* * * * *